United States Patent
O'Donoghue et al.

(10) Patent No.: US 12,426,741 B2
(45) Date of Patent: Sep. 30, 2025

(54) METHOD AND APPARATUS FOR A TAMPER

(71) Applicant: Midea Group Co., Ltd., Foshan (CN)

(72) Inventors: Clayton James O'Donoghue, Shelbyville, KY (US); Paul R. Staun, Sharonville, OH (US)

(73) Assignee: MIDEA GROUP CO., LTD., Guangdong (CN)

( * ) Notice: Subject to any disclaimer, the term of this patent is extended or adjusted under 35 U.S.C. 154(b) by 882 days.

(21) Appl. No.: 17/538,534

(22) Filed: Nov. 30, 2021

(65) Prior Publication Data
US 2023/0165407 A1  Jun. 1, 2023

(51) Int. Cl.
| | | |
|---|---|---|
| *A47J 43/00* | (2006.01) | |
| *A47J 43/07* | (2006.01) | |
| *B01F 31/44* | (2022.01) | |
| *B01F 35/41* | (2022.01) | |
| *B01F 101/06* | (2022.01) | |

(52) U.S. Cl.
CPC .......... *A47J 43/0716* (2013.01); *B01F 31/44* (2022.01); *B01F 35/4111* (2022.01); *B01F 2101/06* (2022.01)

(58) Field of Classification Search
CPC ............... A47J 43/0716; A47J 43/0705; B01F 35/4111; B01F 31/44; B01F 2101/06
See application file for complete search history.

(56) References Cited

U.S. PATENT DOCUMENTS

| | | |
|---|---|---|
| 4,561,782 A | 12/1985 | Jacobsen et al. |
| 5,645,346 A | 7/1997 | Thuna |
| 6,527,433 B2 | 3/2003 | Daniels, Jr. |
| 6,935,767 B2 | 8/2005 | Nikkhah |
| 7,040,799 B2 | 5/2006 | Pryor, Jr. |
| 9,474,419 B2 | 10/2016 | Schneider |
| 2002/0080678 A1* | 6/2002 | Daniels, Jr. .......... A47J 43/0716 366/205 |
| 2018/0168401 A1* | 6/2018 | Weiss .................... A47J 43/288 |
| 2019/0142221 A1 | 5/2019 | Miller et al. |
| 2021/0038029 A1 | 2/2021 | Martin |
| 2021/0177210 A1 | 6/2021 | Tu |
| 2021/0213402 A1 | 7/2021 | Cox |

FOREIGN PATENT DOCUMENTS

| | | |
|---|---|---|
| EP | 3517002 A1 | 7/2019 |
| JP | H024434 A | 1/1990 |
| WO | WO2019099627 A2 | 5/2019 |

* cited by examiner

*Primary Examiner* — Anshu Bhatia
(74) *Attorney, Agent, or Firm* — Gray Ice Higdon

(57) ABSTRACT

A tamper for an appliance. The tamper may include one or more tamping cycles. The tamper may include a motor. The tamper may include one or more mixing mechanisms. The mixing mechanism may be a vibration mechanism. The mixing mechanism may be a blade mechanism. The tamper may include a motion limiter. The tamper may include one or more locking mechanisms releasably engaging the blender. The tamper may include a blender.

22 Claims, 7 Drawing Sheets

METHOD AND APPARATUS FOR A TAMPER

BACKGROUND

The present embodiments relate to a tamper for a device, more specifically for an appliance.

Typical tampers merely include a body to manually push or displace items into the mixing assembly within the blender container while blending. However, this practice may not circulate/mix the contents therein or reduce cavitation. Thus, there is a need to increase circulation of contents and break flow patterns within the blender.

SUMMARY

In some embodiments of the invention, for example, a blender may include a base having a drive mechanism. In various embodiments, the blender may include a container removably attached to the base, wherein the container includes a mixing assembly engageable to the drive mechanism of the base, and wherein the container may include a lid defining an opening, wherein the lid may be removably attached to the container. In some embodiments, the blender may include a tamper extending through the opening of the lid, wherein the tamper includes a motor driving one or more mixing mechanisms.

In some embodiments, the mixing mechanism may be one or more rotating blades. In various embodiments, the tamper may include a proximal end exterior to the lid and a distal end positioned within the container, wherein the distal end may include a terminal end, and wherein the one or more rotating blades may be spaced away from the terminal end towards the proximal end. In some embodiments, the mixing mechanism may be a vibrating portion, wherein the tamper may include a proximal end exterior to the lid and a distal end positioned within the container, wherein the distal end may include the vibrating portion. In various embodiments, the motor may be an eccentric rotating mass vibration motor. In some embodiments, the tamper may include a flange limiting axial insertion of the tamper when engaging the lid of the container. In various embodiments, the tamper may include a locking mechanism to secure the tamper to the lid between a locked position and an unlocked position, wherein when in the locked position the tamper may be axially and rotationally fixed relative to the lid and wherein when in the unlocked position the tamper may be movable relative to the lid.

In various embodiments, a tamper may include a body. In some embodiments, the body may have a proximal end, a distal end, and a flange projecting from the body. In various embodiments, the tamper may include at least one mixing mechanism. In some embodiments, the tamper may include at least one motor driving at least one mixing mechanism.

In addition, in some embodiments, the mixing mechanism may be one or more rotating blades. In various embodiments, the distal end may include a terminal end, wherein the one or more rotating blades may be spaced away from the terminal end towards the proximal end. In some embodiments, the mixing mechanism may be a vibrating portion. In various embodiments, the motor may be an eccentric rotating mass vibration motor. In some embodiments, the tamper may include a locking mechanism to secure the tamper to a container between a locked position and an unlocked position, wherein when in the locked position the tamper may be axially and rotationally fixed relative to the container and wherein when in the unlocked position the tamper may be movable relative to the container. In various embodiments, the tamper may include or be in combination with a blender. In some embodiments, the distal end may include a cavity extending from the flange towards a terminal end. In various embodiments, the motor may be positioned in the cavity adjacent the terminal end.

In various embodiments, a method of tamping contents within a blender with a tamper may comprise the steps of providing a blender having a base and a container removably attached to the base, wherein the base may include a drive mechanism, wherein the container may include a mixing assembly engageable to the drive mechanism of the base, wherein the container may include a lid defining an opening, and wherein the lid may be removably attached to the container. In some embodiments, the method may include providing a tamper having a proximal end and a distal end, wherein the tamper includes a motor and a mixing mechanism. In various embodiments, the method may include inserting the distal end of the tamper through the opening of the lid into an interior of the container. In various embodiments, the method may include controlling the motor to drive the mixing mechanism.

In addition, in some embodiments, the distal end may include a terminal end, wherein the mixing mechanism may be one or more blades spaced away from the terminal end of the tamper. In various embodiments, the method may include rotating the one or more blades in one or more rotational directions. In some embodiments, the mixing mechanism may be one or more vibrating portions. In some embodiments, the method may include vibrating the one or more vibrating portions. In various embodiments, the method may include locking the tamper to the lid. In some embodiments, the method may include the tamper identifying the blender. In various embodiments, the method may include the tamper controlling the blender. In some embodiments, the method may include selecting one or more tamping cycles.

These and other advantages and features, which characterize the embodiments, are set forth in the claims annexed hereto and form a further part hereof. However, for a better understanding of the embodiments, and of the advantages and objectives attained through its use, reference should be made to the Figures and to the accompanying descriptive matter, in which there is described example embodiments. This summary is merely provided to introduce a selection of concepts that are further described below in the detailed description, and is not intended to identify key or essential features of the claimed subject matter, nor is it intended to be used in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
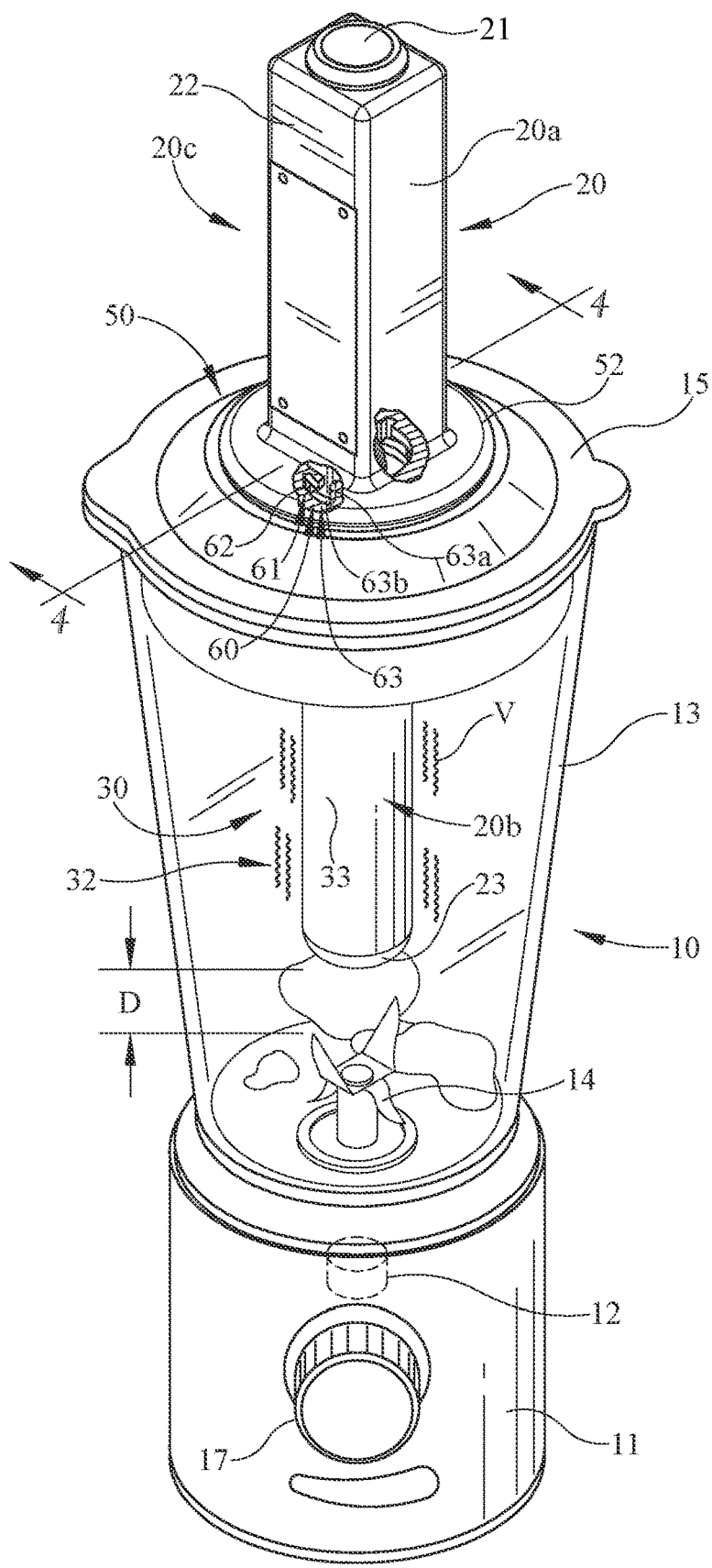
FIG. 1 is a perspective view of one embodiment of a tamper utilizing an embodiment of a blender, illustrating at least a portion of the tamper vibrating in an installed or locked configuration/position with the blender.
Figure 2:
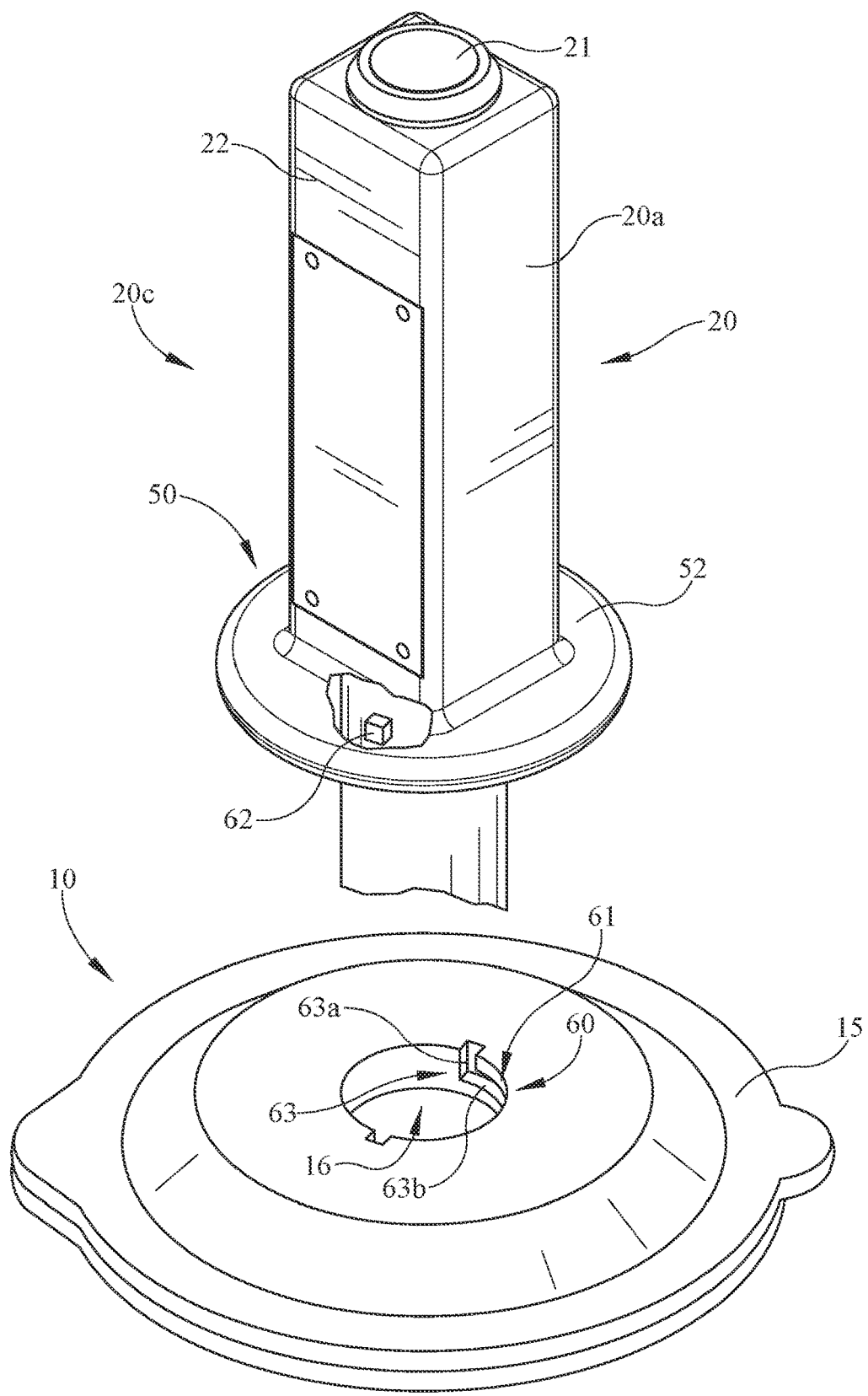
FIG. 2 is an enlarged view of the embodiment of the tamper of FIG. 1 exploded from the lid of the blender, illustrating the tamper in an uninstalled or unlocked configuration/position.

Numerous variations and modifications will be apparent to one of ordinary skill in the art, as will become apparent from the description below. Therefore, the invention is not limited to the specific implementations discussed herein.

The embodiments of the tamper 20, 120 discussed hereinafter will focus on the implementation of the hereinafter-described techniques and apparatuses within a device and/or appliance such as a blender appliance 10, or in other similar applications. However, it will be appreciated that the herein-described techniques and apparatuses may also be used in connection with other types of appliances/devices having mixing volumes/compartments/spaces in some embodiments. In the one embodiment shown, the blender 10, if used, may include a base 11 with a drive mechanism 12 (e.g. motor), and a blending container 13 with an operable blade or mixing assembly 14 (e.g. one or more blades) therein. The mixing assembly 14 is engageable to the drive mechanism 12. The container 13 may be removably attached to the base 11. The container 13, if used, may include a lid 15 removably attached to cover the container 13. The lid 15 may define an opening 16 therethrough to access the interior of the container/lid volume. If and when the tamper 20, 120 is not engaging or uninstalled with the lid 15, the blender or lid 15 may include a cover (not shown) to removably engage the opening 16 of the lid 15 between a closed position and an open position. Control over blender 10 by a user is generally managed through a control panel or controls 17 typically disposed on a top or front of base 11, and it will be appreciated that in different blender designs, the control panel 17 may include various types of input and/or output devices, including various knobs, buttons, lights, switches, textual and/or graphical displays, touch screens, etc. through which a user may select/configure one or more settings and start/stop one or more blending cycles of the blender and/or tamping cycles of the tamper 20, 120. Alternatively, or in combination with the controls 17 of the blender 10, the user may manage through a control panel or controls 21 disposed on the exterior or body 20a of the tamper 20, 120, or portions thereof, and it will be appreciated that in different tamper designs, the control panel 21 may include various types of input and/or output devices, including various knobs, buttons, lights, switches, textual and/or graphical displays, touch screens, etc. through which a user may select/configure one or more settings and start/stop one or more tamping cycles of the tamper and/or blending cycles of the blender. The tamper controls 21 may provide for one or more tamping cycles, alone or in combination with blender or blending cycles, to provide a variety of time intervals or patterns, starting (e.g. automatically and/or manually), stopping (e.g. automatically and/or manually), rotation of one or more blades, direction of blades, one or more vibrations or vibrating portions, levels of vibration, speeds of blades, and/or set or preset modes by the user to assist, manipulate, mix, tamp, and/or circulate contents and break flow patterns. For example, a preset mode of the control for one or more tamping cycles may be a puree cycle, pulse cycle, vibration cycle, chopping cycle via blade(s), intermittent cycle, and/or a continuous cycle. Alone or in addition to the mixing mechanisms and/or tamping cycles, the tamper may be manually moved, used, or forced by the user to tamp or engage the contents within the container blender.

In some implementations, one or more tampers 20, 120 or portions thereof may be positioned within the blender 10, or portions thereof (e.g. container 13, lid 15, opening 16, interior), to mix or increase/enhance the blending/tamping process/cycle. The tamper 20, 120 increases the blending/tamping of the contents (e.g. foodstuffs, ingredients, etc.) within the container 13. In some implementations, the tamper 20, 120 increases blending/tamping in addition to or alternatively to manual pushing or displacing contents. The tamper 20, 120 may include at least one mixing mechanism 30 (e.g. vibration mechanism 32, blade mechanism(s) 34, etc.) that increases the blending/tamping performance (e.g. change circulation, displacing, agitate, blend, smash, and/or chop). The tamper 20, 120 may include a motion limiter 50 (e.g. flange, collar) to stop or limit the vertical insertion or position into the container volume/interior so that the tamper and/or terminal end 23 is a distance D away from the mixing assembly 14. The tamper 20, 120 may include a locking mechanism 60 engaging the blender 10 (e.g. lid 15, opening 16, container 13) to at least rotationally, translationally, and/or axially fix the tamper 20, 120 in relation to the blender 10, or portions thereof. Although the tamper 20, 120 is shown as powered with one or more batteries 72, it should be understood that the tamper 20, 120 may be powered in a variety of ways. For example, line electricity, induction, and/or by the blender, or portions thereof. More than one tamper may have different tamping/blending characteristics and be used with one or more blenders in a variety of applications. For example, the user may have kit of tampers such as a first tamper with a blade mechanism (see FIGS. 5 and 6), a second tamper with a vibration mechanism (see FIGS. 1-4), and a third tamper with both a blade mechanism and vibration mechanism (not shown) that may be selected by the user to be used with a blender/tamper application. For example, another kit may include two or more tampers having a different shape and/or size. It should be understood that a variety of mixing mechanisms may be used in the tamper and still be within the scope of the invention.

In some implementations, the tamper 20, 120 may include a body 20a. The tamper 20, 120 and/or body 20a may have a distal end 20b and a proximal end 20c. The tamper 20, 120 or distal end 20b may be inserted or extend through the opening 16 of the lid 15 and at least partially into the interior of the container 13. The tamper 20, 120 or proximal end 20c may extend out from the lid 15 or container 13 and/or may be at least partially exterior to the container/lid. In some embodiments, the proximal end 20c may not project from or be substantially exterior to the container/lid. For example, one tamper embodiment may not include a handle and may be connected/mounted/held to the lid (e.g. flange, locking mechanism, etc.) during tamping/blending. The body 20a or tamper 20, 120 may include the motion limiter 50. The motion limiter 50, if used, may be one or more flanges 52. The tamper 20, 120 or proximal end 20c may include a handle 22, the flange 52, and/or controls 21. The flange 52, if used, may limit axial insertion of the tamper when engaging the lid 15 of the container 13. The flange 52 may project outwardly (e.g. radially) from the tamper, body 20a, proximal end 20c, and/or distal end 20b. In the one embodiment shown, the flange 52 extends outwardly from the proximal end 20*c*. The handle 22 may extend upwardly or away from the flange 52. The distal end 20*b* may extend downwardly or away from the flange 52. The tamper 20, 120 or distal end 20*b* may include the mixing mechanism/portion 30 (e.g. 32 and/or 34) and/or a terminal end or surface 23. The distal end 20*b* may be positioned within the container 13. The tamper or distal end 20*b* may include a cylindrical outer periphery, although other shapes are within the scope of the invention. The terminal end 23 may be arcuate as shown in the embodiments or planar in shape. Although a variety of materials made be use, the body 20*a* or portions thereof may be of a plastic material (e.g. polyurethane) or silicone rubber. The body 20*a* may include or define one or more cavities 24 therein. The one or more cavities include a gasket and/or seal (not shown). The cavities or chambers 24 may house one or more components (e.g. electrical, non-electrical, batteries, motor, controls, controller, wiring, etc.) of the tamper. The tamper body may be a variety of shapes, sizes, quantities, and constructions and still be within the scope of the invention. For example, the body 20*a* may be made as a single component or multiple components.

Figure 6:
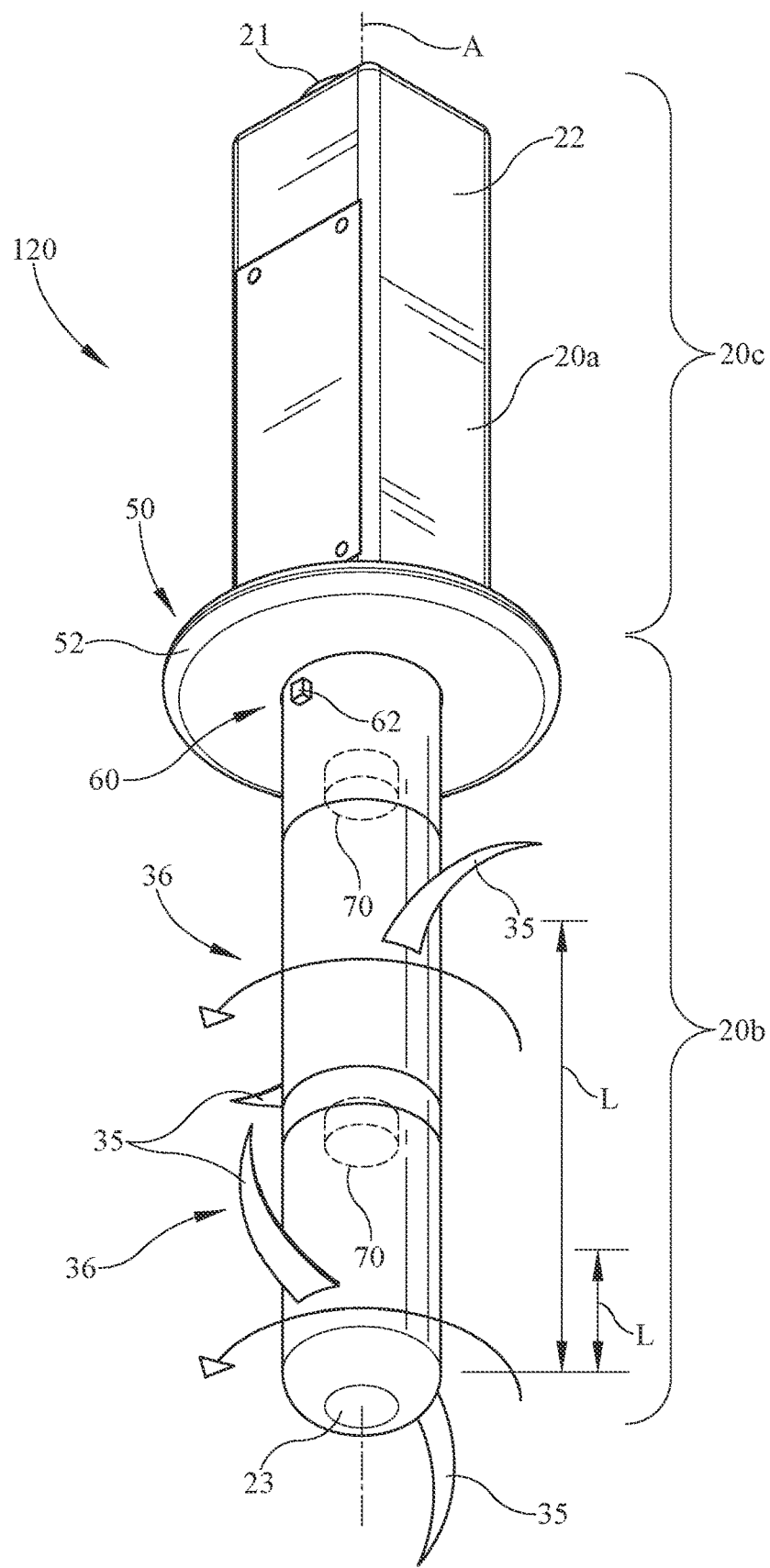
FIG. 6 is a bottom perspective view of the tamper of FIG. 5.

In some implementations, the tamper 20, 120 may include one or more motors 70 driving the one or more mixing mechanisms 30, 32, 34. As shown in the embodiments, the one or more motors drive the mixing mechanism 30 when activated. The one or more motors 70 may power the one or more vibration mechanisms 32, or portions thereof, as shown in FIG. 4. The one or more motors 70 may power the one or more blade mechanisms 34, or portions thereof, as shown in FIG. 6. The motor 70 may be positioned within one or more compartments/cavities 24. As shown in FIGS. 4 and 6, the motor(s) 70 is positioned in the distal end 20*b*, cavity 24, spaced away from the distal end, and/or adjacent the terminal end 23. The speed/activation of the motor 70 may be varied by the user, controls 21, 17, controller 40, 140. The housing or body 20*a* of the tamper 20, 120 may include one or more controls 21 that a user may actuate in order to control the motor 70, including powering the motor on and/or off and/or controlling the speed/direction of the motor. In some embodiments, these one or more controls 21 may include buttons, knobs, sliding mechanisms or the like. In the one embodiment shown in FIGS. 1-4, as will be described in greater detail herein, the motor 70 may be an eccentric rotating mass vibration motor.

Figure 3:
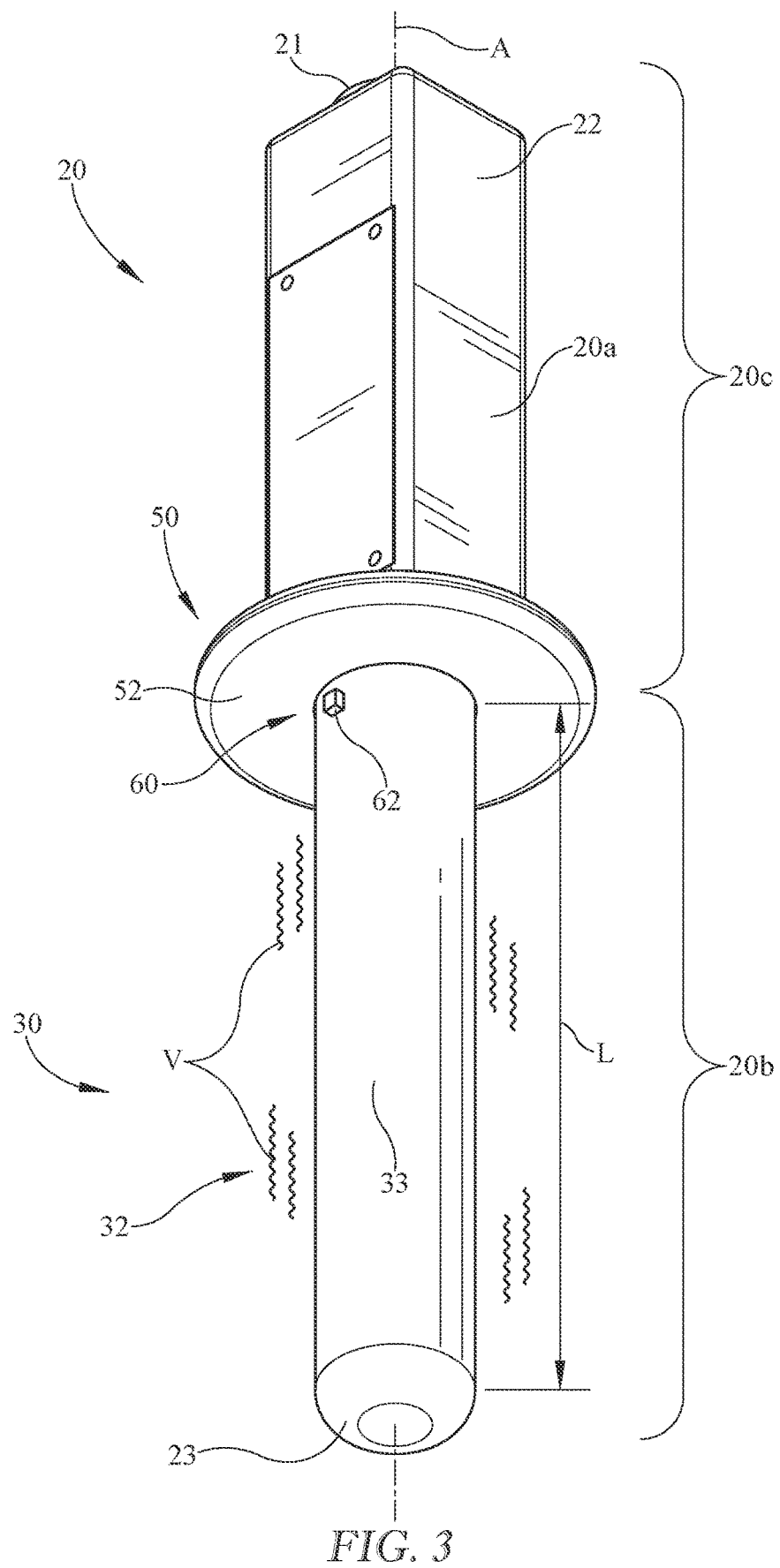
FIG. 3 is a bottom perspective view of the tamper of FIG. 1.
Figure 4:
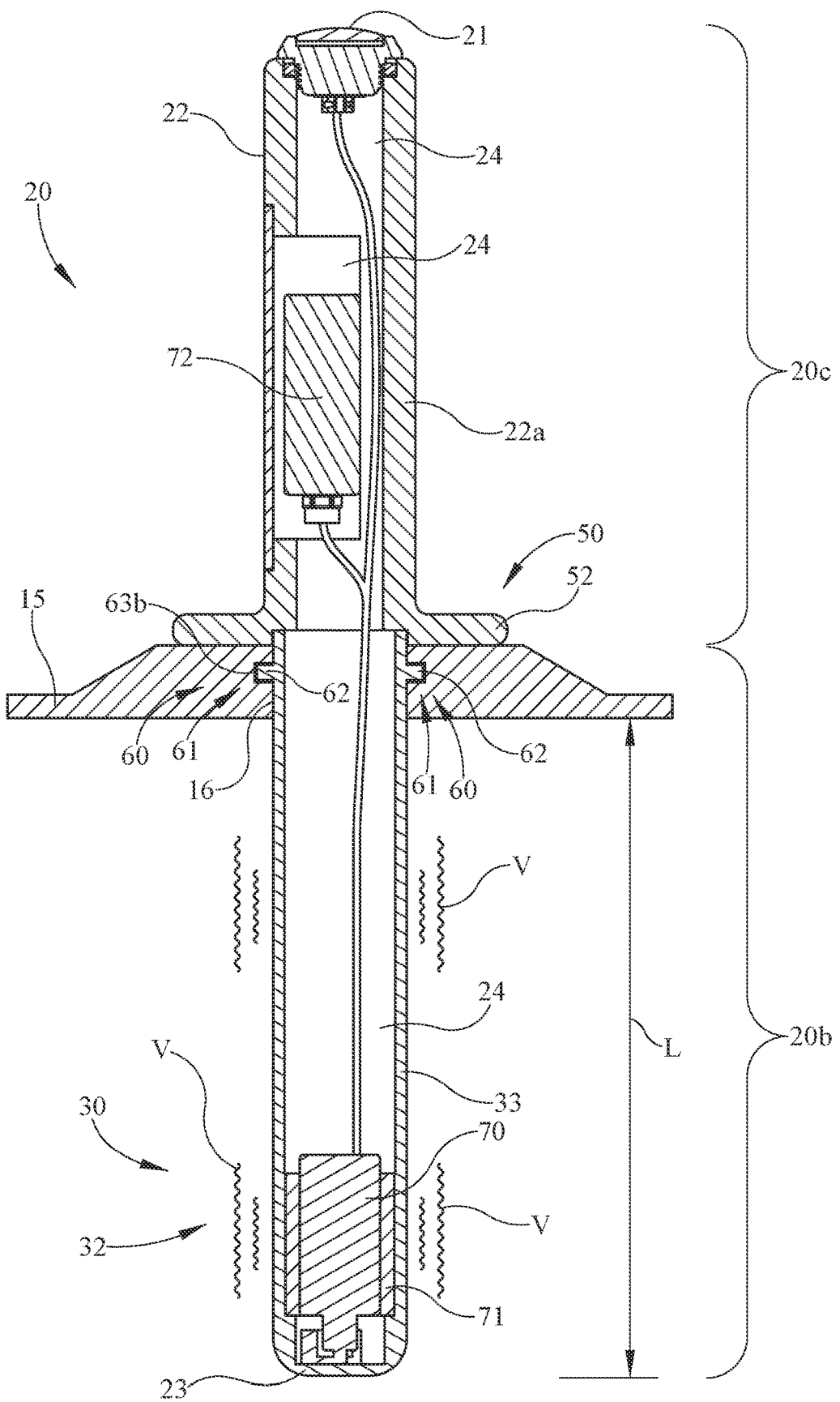
FIG. 4 is a sectional view of the tamper of FIG. 1 taken along line 4-4.

In one implementation as shown in FIGS. 1-4, the mixing mechanism 30 of the tamper 20 may be one or more vibration mechanisms 32. The vibration mechanism 32 may be one or more vibrating portions/ends 33 vibrating at one or more vibration levels/speeds to create one or more tamping cycles. The tamper 20 or distal end 20*b* may include the one or more vibrating portions 33. The vibration V from the distal end 20*b* or vibrating portions 33 may vary along the longitudinal axis A of the tamper. For example, in some embodiments, the distal end 20*b* adjacent the terminal end 23 may vibrate while portions of the distal end do not vibrate, vibrate less, and/or vibrate at another time. Another example, the vibration V may decrease the further distance you go away from the distal/terminal end. The vibrating portions 33, if used, may be a variety of quantities and positioned or extend for a variety of lengths along the distal end 20*b* of the tamper 20. As shown in the FIGS. 3, the vibrating portion 33 extends from the terminal end 23 for a length L towards the flange 52 or proximal end 20*c*. The distal end 20*b* or vibrating portion 33 may be a single member with a single terminal end 23 as shown in FIG. 3, however multiple vibrating portions/members with multiple terminal ends may be used in some embodiments. The vibrating portion 33 may be the outer periphery of the distal end (e.g. outer circumference and/or terminal end) engaging the contents, or portions thereof, within the blender. The outer periphery, or portions thereof, may vibrate from the one or more motors 70 (e.g. eccentric rotating mass vibration motor). The motor 70 may be positioned in the cavity 24 within the distal end 20*b* and/or adjacent the terminal end 23. The cavity may extend from the flange to the terminal end. The motor 70 may be surrounded by a motor casing 71.

Figure 5:
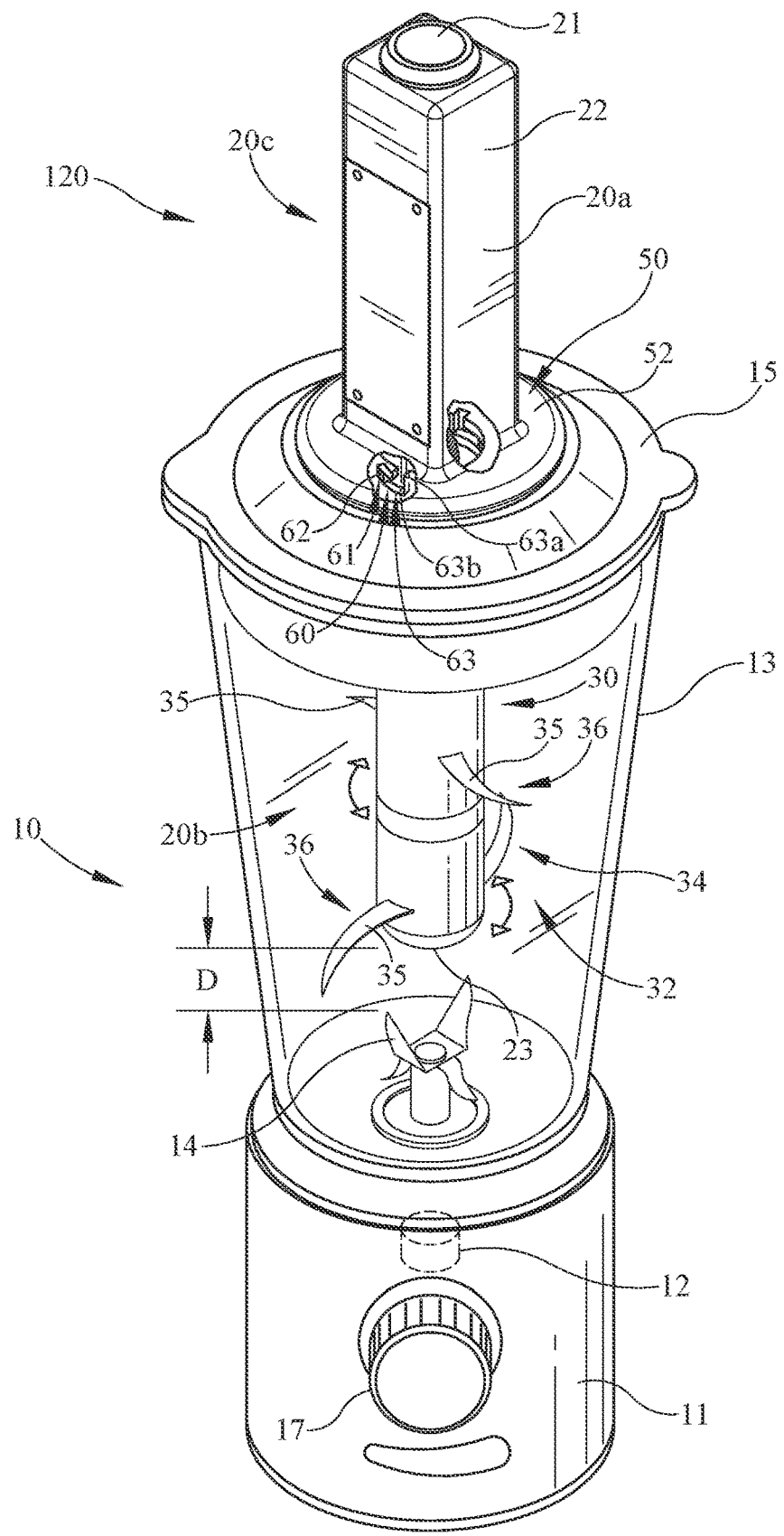
FIG. 5 is a perspective view of another embodiment of a tamper utilizing an embodiment of a blender, illustrating at least a portion of the tamper with one or more blades in an installed or locked configuration/position with the blender.

In one implementation as shown in FIGS. 5 and 6, the mixing mechanism 30 of the tamper 20 may be one or more blade mechanisms 34. The blade mechanism 34 may be one or more rotating blades 35 in one or more rotational directions/speeds to create one or more tamping cycles. The tamper 20 or distal end 20*b* may include one or more rotating blades 35. The one or more blades 35, if used, may project from the outer periphery of the distal end 20*b* or tamper 20, or portions thereof. The one or more rotating blades 35 and/or portions of the distal end 20*b* may rotate about the longitudinal axis A extending from the proximal end 20*c* to the distal end 20*b*. The rotating blades 35, if used, may be positioned at one or more lengths L of the distal end 20*b* and/or from the terminal end 23. The rotating blades 35 may be spaced away from the terminal end 23 or distal end 20*b*. The terminal end or surface 23 may be free from the one or more blades 35. Although two blade sets 36 of rotating blades 35 are shown in FIGS. 5 and 6 spaced from each other at different lengths from the terminal end 23, it should be understood a single blade and/or single set may be used. If two or more blade sets 36 or blades 35 are used, the blades or blade sets may rotate in the same or different directions and/or the same or different speeds to create a variety of tamping cycles. One or more motors 70 may drive one or more of the blades 35 or blade sets 36. The blade 35 may be a variety of shapes, sizes, quantities, and constructions and still be within the scope of the invention. For example, although each blade set 36 includes two opposing blades 35 in the one embodiment it should be understood that a blade set may include a single blade 35 rotated alone or in combination with another rotating blade set (e.g. same or different number of blades or blade set).

In some implementations, the tamper 20, 120 and/or blender 10 may include one or more locking mechanisms 60 to secure the tamper 20, 120 to the blender 10, or portions thereof. The locking mechanism 60, if used, of the tamper 20 may engage the blender 10 (e.g. lid, opening, container) to rotationally, translationally, and/or axially fix the tamper in relation to the blender, or portions thereof. The one or more locking mechanisms 60 may orientate the tamper relative to the blender, or portions thereof, in one or more orientations. For example, the tamper 20, 120 may be substantially vertical as shown in the one embodiment or may be positioned at one or more angles relative to the vertical/longitudinal axis A. The one or more locking mechanisms 60 may secure the tamper 20, 120 to the container 13, or portions thereof, between a locked position (see FIGS. 1, 4, and 5) and an unlocked position (see FIGS. 2 and 3). When in the locked position the tamper may be axially, translationally, laterally, and/or rotationally fixed relative to the container 13 (e.g. lid, opening, etc.). When in the unlocked position the tamper may be movable (e.g. axially, laterally, translationally, and/or rotationally) relative to the container (e.g. lid, opening, etc.). As shown in the one embodiment, the locking mechanism 60 may be one or more pin and slot engagements 61. The pin and slot engagement 61, or portion thereof, may be positioned on the tamper 20, 120, flange 52, or body 20*a*, or portions thereof (e.g. outer periphery, proximal end 20*c*, distal end 20*b*, or between the proximal end and distal end). One embodiment of the pin and slot engagement 61 may include one or more pins or bayonets 62 positioned on the tamper (e.g. outer periphery, adjacent or below the flange, etc.) releasably engaging one or more slots or grooves 63 positioned on the container 13 (e.g. lid, opening, etc.). Alternatively, the pin and slots may be reversed on the blender and tamper in some embodiments. Although opposing pins/tabs 62 projecting from the outer periphery of the tamper body are shown in the one embodiment, a single pin 62 or pin and slot engagement 61 may be used. The corresponding one or more slots 63 may be a vertical slot 63*a* engaging or intersecting a circumferential slot 63*b* within the lid 15, container 13, and/or defining the opening 16. The tamper 20 or pin(s) 62 may be axially (e.g. downwardly) received with the vertical slot(s) 63*a* of the opening/lid and subsequently rotated into the circumferential slot(s) 63*b* of the opening/lid to engage or secure the tamper 20, 120 with the container/lid/opening. The reverse movement between the tamper and blender may disengage the tamper or pin(s) from the slot(s) or lid 15. It should be understood that the locking mechanism may be a variety of constructions, quantities, shapes, and sizes and still be within the scope of the invention.

Figure 7:
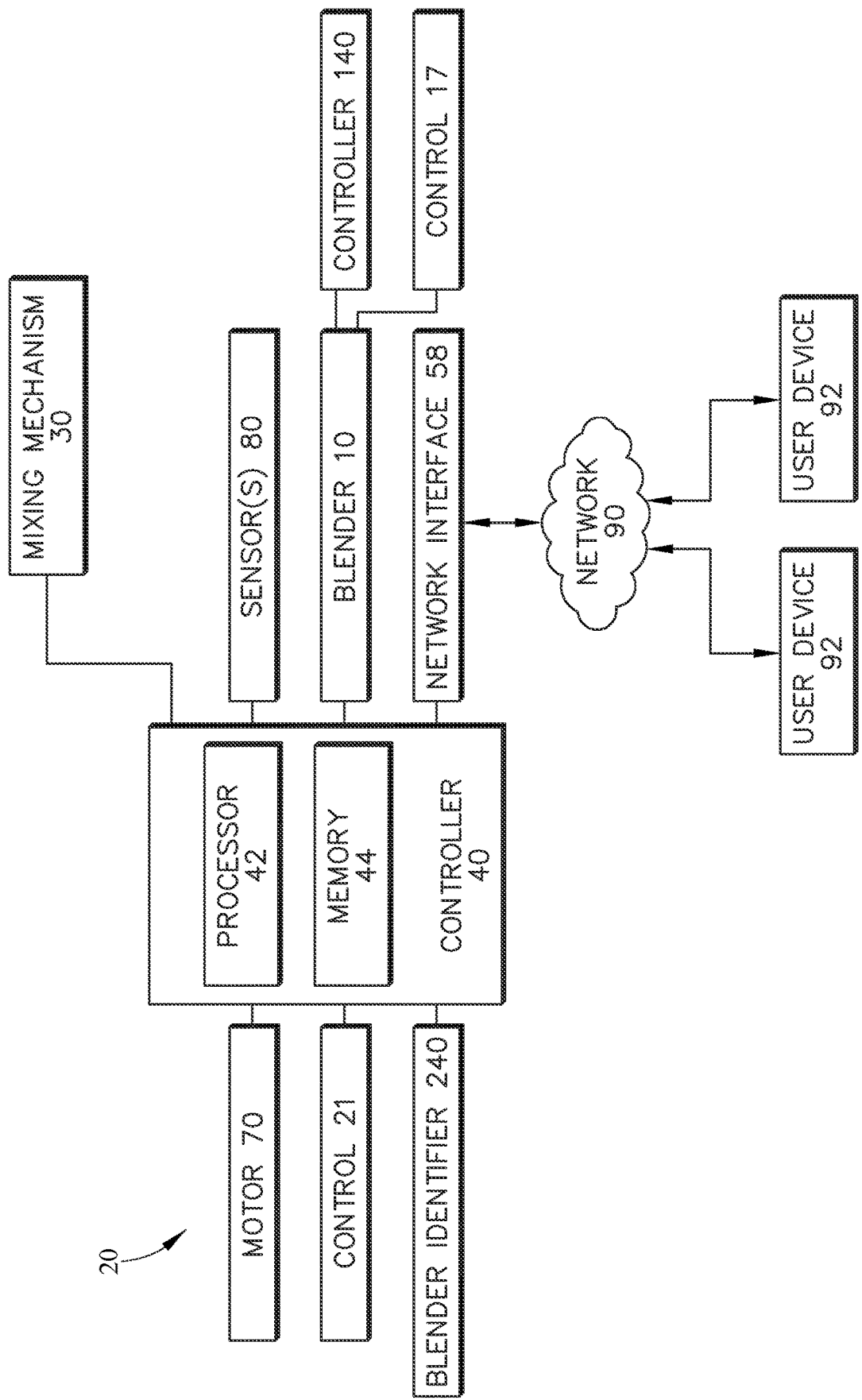
FIG. 7 is a block diagram of an example control system for the tamper embodiments of FIGS. 1 and/or 5.

A tamper 20, 120 consistent with the description herein may also generally include one or more controllers 40 configured to control the operation of the tamper 20, 120 as well as manage interaction with a user. FIG. 7 for example, illustrates an example embodiment of the tamper including a controller 40 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40.

As shown in FIG. 7, controller 40, if used, may be interfaced with various components, including one or more motors or other drive for powering the tamper 20, 120 and/or mixing mechanism 30 (e.g. vibration mechanism (s) and/or rotational blade(s) mechanism) and one or more controls 21 on the housing/body for receiving user input (e.g., various combinations of switches, knobs, buttons, sliders, touchscreens or touch-sensitive displays, microphones or audio input devices, image capture devices, etc.). The controller 40 may be interfaced with a blender identifier 240 coupled to the housing/body, that the controller may use to determine the type of blender coupled to the tamper. In some instances, the controller 40 may also interface with one or more controls 17 on the blender for receiving user input, and/or one or more controls (including various indicators, graphical displays, textual displays, speakers, etc.) disposed on the tamper and/or the blender, as well as various additional components suitable for use in the tamper. For example, various blenders in some embodiments may include various electromechanical components such as motors, drives, actuators, mixing assembly, etc. that may be controllable by controller 40 and powered by the housing. A blender 10 may also include a controller 140 or other logic circuit in communication with the controller 40, and may include various controls, sensors, displays, etc. in communication with the controller.

Controller 40 may also be interfaced with various sensors 80, including various sensors usable in connection with adjusting or controlling a speed of the motor 70. For example, a sensor for determining motor torque may be used to adjust cycle times and/or speeds based on whether the motor has reached a steady state. As another example, a temperature sensor may be used to adjust speed and/or run time of the motor 70 of the tamper 20, 120, for example based on a sensed temperature of the item being blended/tamped. It is to be understood these are merely examples, and are not intended to be limiting, as other sensors known in the art may also be incorporated into the tamper. In some instances, the sensor(s) may be disposed within the blender; while in other instances, the sensor(s) may be disposed in the housing/tamper.

In some embodiments, controller 40 may also be coupled to one or more network interfaces 58, e.g., for interfacing with external devices via wired and/or wireless networks such as Ethernet, Wi-Fi, Bluetooth, NFC, cellular and other suitable networks, collectively represented in FIG. 7 at 90. Network 90 may incorporate in some embodiments a home automation network, and various communication protocols may be supported, including various types of home automation communication protocols. In other embodiments, other wireless protocols, e.g., Wi-Fi or Bluetooth, may be used.

In some embodiments, tamper and/or blender may be interfaced with one or more user devices 92 over network 90, e.g., computers, tablets, smart phones, wearable devices, etc., and through which tamper/blender may be controlled and/or tamper/blender may provide user feedback. For example, in some instances, the tamper 20, 120 may be wirelessly interfaced (e.g. via Bluetooth) with a user device 92, so that the user may communicate with the tamper through the user device 92. This may in some instances, include through the use of a voice assistant. In other instances, the tamper may be wirelessly interfaced (e.g. via Bluetooth) with a user device 92 so that the user device 92 may be used as a display. In still other instances, the tamper may be wirelessly interfaced (e.g. via Bluetooth) with a user device 92 so that additional preprogrammed cycles (e.g. blending and/or tamping cycles) may be added to the tamper, for example if a new drink/product or blender is released.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the sequences of operations performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized, and/or supplemented with other techniques known in the art, and therefore, the invention is not limited to the particular sequences of operations described herein.

In use, the tamper 20, 120 may be installed or inserted into the blender 10 (e.g. opening, lid, container), or portions thereof. A cover, if used, may be removed from the lid/opening to allow insertion of at least a portion of the tamper. With the tamper 20, 120 and/or distal end 20b within the blender volume, the motion limiter 50, if used, may stop further axial insertion. The tamper 20, 120 may be locked to the blender, or portions thereof (e.g. lid, opening). The locking mechanism 60, if used, may lock the tamper 20, 120 in one or more positions (e.g. angles, axial, rotation, etc.). The locking mechanism 60 may be engaged with a push and turn by the user to engage the locking mechanism 60 or pin and slot engagement 61. The controller 40, 140 may be used to control the tamper 20, 120 and/or blender 10 in various embodiments. The controller 40, 140 may be used to drive (e.g. the motor or drive mechanism) the mixing mechanism 30. The controls 21, 17 may be used to control activation of the controller, motor, tamper, and/or mixing mechanism. The user may select one or more tamping cycles for one or more applications of the tamper. The mixing mechanism 30 may be the vibrating mechanism 32 and/or the blade mechanism 34 of one or more tamper devices. In some embodiments, the motor 70 may vibrate one or more of the vibrating portions 33 alone or in combination with the mixing assembly 14 of the blender 10. In other embodiments, the motor 70 may rotate the one or more blades 35 in one or more rotational directions alone or in combination with the mixing assembly 14. The blender identifier 240, if used, may identify the blender (e.g. type, model, characteristics) being used to configure the tamper and/or for one or more tamping cycles associated with one or more tampers.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A blender comprising:
a base having a drive mechanism;
a container removably attached to the base, wherein the container includes a mixing assembly engageable to the drive mechanism of the base, and wherein the container includes a lid defining an opening, wherein the lid is removably attached to the container; and
a tamper extending through the opening of the lid, wherein the tamper includes a motor driving a mixing mechanism, wherein the mixing mechanism is a vibrating portion, wherein the tamper includes a proximal end exterior to the lid and a distal end positioned within the container, wherein the distal end includes the vibrating portion.

2. The blender of claim 1 wherein the mixing mechanism is one or more rotating blades.

3. The blender of claim 2 wherein the distal end of the tamper includes a terminal end, and wherein the one or more rotating blades are spaced away from the terminal end towards the proximal end.

4. The blender of claim 1 wherein the motor is an eccentric rotating mass vibration motor.

5. The blender of claim 1 wherein the tamper includes a flange limiting axial insertion of the tamper when engaging the lid of the container.

6. The blender of claim 1 wherein the tamper includes a locking mechanism to secure the tamper to the lid between a locked position and an unlocked position, wherein when in the locked position the tamper is axially and rotationally fixed relative to the lid and wherein when in the unlocked position the tamper is movable relative to the lid.

7. A tamper comprising:
a body having a proximal end, a distal end, and a flange projecting from the body;
a mixing mechanism;
a motor driving the mixing mechanism; and
wherein the distal end includes a cavity extending from the flange towards a terminal end, and the motor is positioned in the cavity adjacent the terminal end.

8. The tamper of claim 7 wherein the mixing mechanism is one or more rotating blades.

9. The tamper of claim 8 wherein the one or more rotating blades are spaced away from the terminal end towards the proximal end.

10. The tamper of claim 7 wherein the mixing mechanism is a vibrating portion.

11. The tamper of claim 10 wherein the motor is an eccentric rotating mass vibration motor.

12. The tamper of claim 7 further comprising a locking mechanism to secure the tamper to a container between a locked position and an unlocked position, wherein when in the locked position the tamper is axially and rotationally fixed relative to the container and wherein when in the unlocked position the tamper is movable relative to the container.

13. The tamper of claim 7 in combination with a blender.

14. A blender comprising:
a base having a drive mechanism;
a container removably attached to the base, wherein the container includes a mixing assembly engageable to the drive mechanism of the base, and wherein the container includes a lid defining an opening, wherein the lid is removably attached to the container; and
a tamper extending through the opening of the lid, wherein the tamper includes a motor driving a mixing mechanism, and wherein the tamper includes a locking mechanism to secure the tamper to the lid between a locked position and an unlocked position, wherein when in the locked position the tamper is axially and rotationally fixed relative to the lid and wherein when in the unlocked position the tamper is movable relative to the lid.

15. The blender of claim 14 wherein the mixing mechanism is one or more rotating blades.

16. The blender of claim 15 wherein the tamper includes a proximal end exterior to the lid and a distal end positioned within the container, wherein the distal end includes a terminal end, and wherein the one or more rotating blades are spaced away from the terminal end towards the proximal end.

17. The blender of claim 14 wherein the tamper includes a flange limiting axial insertion of the tamper when engaging the lid of the container.

18. A tamper comprising:
a body having a proximal end, a distal end, and a flange projecting from the body;
a mixing mechanism;
a motor driving the mixing mechanism; and
a locking mechanism to secure the tamper to a container between a locked position and an unlocked position, wherein when in the locked position the tamper is axially and rotationally fixed relative to the container and wherein when in the unlocked position the tamper is movable relative to the container.

19. The tamper of claim 18 wherein the mixing mechanism is one or more rotating blades.

20. The tamper of claim 19 wherein the distal end includes a terminal end, wherein the one or more rotating blades are spaced away from the terminal end towards the proximal end.

21. The tamper of claim 18 wherein the mixing mechanism is a vibrating portion.

22. The tamper of claim 18 in combination with a blender.

* * * * *